(12) United States Patent
Westin

(10) Patent No.: US 9,083,624 B2
(45) Date of Patent: Jul. 14, 2015

(54) MOBILE DEVICE OR COMPUTER THEFT RECOVERY SYSTEM AND METHOD

(75) Inventor: Kenneth Vernon Westin, Portland, OR (US)

(73) Assignee: ActiveTrak, Inc., Portland, OR (US)

(*) Notice: Subject to any disclaimer, the term of this patent is extended or adjusted under 35 U.S.C. 154(b) by 912 days.

(21) Appl. No.: 12/589,437

(22) Filed: Oct. 23, 2009

(65) Prior Publication Data

US 2010/0115092 A1    May 6, 2010

Related U.S. Application Data

(63) Continuation-in-part of application No. 11/823,575, filed on Jun. 28, 2007, now abandoned.

(60) Provisional application No. 60/892,780, filed on Mar. 2, 2007, provisional application No. 61/197,284, filed on Oct. 23, 2008.

(51) Int. Cl.
| | |
|---|---|
| G06F 15/16 | (2006.01) |
| G06F 15/177 | (2006.01) |
| G06F 15/173 | (2006.01) |
| G06F 7/04 | (2006.01) |
| G08B 1/08 | (2006.01) |
| H04L 12/24 | (2006.01) |
| H04W 4/02 | (2009.01) |

(Continued)

(52) U.S. Cl.
CPC ............ *H04L 41/12* (2013.01); *H04L 63/1466* (2013.01); *H04L 67/02* (2013.01); *H04L 67/18* (2013.01); *H04W 4/02* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 5,898,391 A | 4/1999 | Jefferies et al. | |
| 6,128,739 A * | 10/2000 | Fleming, III | 726/35 |

(Continued)

FOREIGN PATENT DOCUMENTS

| | | |
|---|---|---|
| JP | 2002024091 | 1/2002 |
| JP | 2005295309 | 10/2005 |

(Continued)

OTHER PUBLICATIONS

Non-Final Office Action; U.S. Appl. No. 12/044,795, mailed on Jul. 25, 2008, 23 pages.

(Continued)

*Primary Examiner* — Ninos Donabed
*Assistant Examiner* — Farrukh Hussain
(74) *Attorney, Agent, or Firm* — Perkins Coie LLP

(57) ABSTRACT

A mobile device, e.g. portable computer, location tracking and data backup-and-wipe system and method enable a lost or stolen device to be recovered by reporting to its rightful owner and optionally to others its approximate location via triangulation and the use of location service providers. Social network members may be made aware automatically of the location of a reported lost or stolen device and can assist the rightful owner in recovering it based upon their identification of the user of the device, whether by the location coordinates or by viewing a photographic image taken by the computer. Alternatively, in governmental and/or institutional settings having privacy concerns, no photographic images are sent to a public website. Instead, they are sent to a proprietary employer server and maintained behind an institutional firewall.

20 Claims, 5 Drawing Sheets

(51) Int. Cl.
*H04L 29/06* (2006.01)
*H04W 12/12* (2009.01)
*H04L 29/08* (2006.01)

(56) References Cited

U.S. PATENT DOCUMENTS

| | | | |
|---|---|---|---|
| 6,244,758 B1 | 6/2001 | Solymar et al. | |
| 6,300,863 B1 | 10/2001 | Cotichini et al. | |
| 6,433,685 B1* | 8/2002 | Struble et al. | 340/571 |
| 6,725,379 B1 | 4/2004 | Dailey | |
| 6,804,699 B1 | 10/2004 | Henrie | |
| 6,950,946 B1 | 9/2005 | Droz et al. | |
| 7,233,791 B2 | 6/2007 | Gilbert et al. | |
| 7,242,588 B2 | 7/2007 | Kitsopoulos | |
| 7,272,723 B1 | 9/2007 | Abbott et al. | |
| 7,496,201 B2 | 2/2009 | Westin | |
| 2001/0056544 A1 | 12/2001 | Walker | |
| 2004/0203601 A1 | 10/2004 | Morriss et al. | |
| 2005/0071670 A1* | 3/2005 | Hafeman | 713/200 |
| 2005/0131629 A1 | 6/2005 | Ignatin | |
| 2005/0159184 A1 | 7/2005 | Kerneir et al. | |
| 2005/0250440 A1 | 11/2005 | Zhou et al. | |
| 2005/0280557 A1* | 12/2005 | Jha et al. | 340/988 |
| 2006/0004905 A1 | 1/2006 | Martino | |
| 2006/0112418 A1 | 5/2006 | Bantz et al. | |
| 2006/0130004 A1 | 6/2006 | Hughes et al. | |
| 2006/0145839 A1 | 7/2006 | Sandage | |
| 2006/0153167 A1 | 7/2006 | Schunemann | |
| 2006/0195261 A1 | 8/2006 | Riley | |
| 2006/0224742 A1 | 10/2006 | Shahbazi | |
| 2006/0272034 A1* | 11/2006 | Bhansali et al. | 726/34 |
| 2007/0011724 A1 | 1/2007 | Gonzalez et al. | |
| 2007/0103300 A1 | 5/2007 | Peng | |
| 2007/0138999 A1 | 6/2007 | Lee et al. | |
| 2007/0143827 A1 | 6/2007 | Nicodemus et al. | |
| 2007/0143851 A1 | 6/2007 | Nicodemus et al. | |
| 2007/0172064 A1 | 7/2007 | Nonaka et al. | |
| 2007/0195373 A1* | 8/2007 | Singh | 358/302 |
| 2007/0197261 A1 | 8/2007 | Humbel | |
| 2007/0198630 A1 | 8/2007 | Jacobson et al. | |
| 2007/0271348 A1 | 11/2007 | Yang | |
| 2007/0283002 A1 | 12/2007 | Bornhoevd et al. | |
| 2008/0147781 A1* | 6/2008 | Hopmann et al. | 709/203 |
| 2008/0215720 A1 | 9/2008 | Westin | |

FOREIGN PATENT DOCUMENTS

| | | |
|---|---|---|
| JP | 20007028639 | 2/2007 |
| JP | 2007122457 | 5/2007 |

OTHER PUBLICATIONS

Final Office Action; U.S. Appl. No. 12/044,795, mailed on Sep. 15, 2008, 28 pages.
Non-Final Office Action; U.S. Appl. No. 11/823,575, mailed on Jul. 14, 2009, 19 pages.
Final Office Action; U.S. Appl. No. 11/823,575, mailed on Jan. 29, 2010, 21 pages.
Non-Final Office Action; U.S. Appl. No. 11/823,575, mailed on Jun. 8, 2010, 20 pages.
Final Office Action; U.S. Appl. No. 11/823,575, mailed on Nov. 17, 2010, 23 pages.
Fossen, E.A., "Principles of Internet Investigations: Basic Reconnaissance, Geopositioning and Public Information Sources," Jun. 13, 2005 http://scholar.google.com/scholar?hl=en&lr=&cluster=7807050719521451010.
Gajparia, Anand S., "On User Privacy for Location-based Services," Ph.D. dissertation, University of London, 2007, Department of Mathematics.
Koodli, R., et al., "Location Privacy with IP Mobility,"First International Conference on Security and Privacy for Emerging Areas in Communications Networks, pp. 222-224. DOI.ieeecomputersociety.org/10.1109/SECURECOMM.2005.44.
Koshima, H., et al., "Personal Locator Services Emerge,"in: Spectrum, IEEE, Feb. 2000, vol. 37, Issue: 2, pp. 41-48, INSPEC Accession No. 6501294, DOI: 10.1109/6.819928, Posted online: Aug. 6, 2002 23:49:35.0.
Lim, Yu-Xi, "Secure Geolocation for Wireless Indoor Networks," Apr. 12, 2006, Georgia Institute of Technology, master's thesis, http://hdl.handle.net/1853/11454.
Meyer, Shane, "Laptop Security, a Guide to Protecting Your Laptop," Security Essentials GSEC Practical Assignment, Version 1.4b Option 1, SANS Institute 2003, http://scholar.google.com/scholar?hl=en&q=network+recovery+stolen+flash+drive++patents&spell=1.
Russinovich, Mark, "Mark's Blog: More on Sony: Dangerous Decloaking Patch, EULAs and Phoning Home," 2005, pp. 1-82.
Russinovich, Mark, "Mark's Blog: Sony, Rootkits and Digital Rights Management Gone Too Far," 2005, pp. 1-253.
Schneier, Bruce, "Schneier on Security: Sony's DRM Rootkit: The Real Story," Nov. 17, 2005, pp. 1-93.
Unknown Author, "USB Drive AutoRun.inf Tweaking," printed from http://dailycupoftech.com/usb-drive-autoruninf-tweaking/on Jul. 9, 2008, accessible to the public as least as early as Sep. 27, 2006 as evidenced by date of comments to article, pp. 1-47.

* cited by examiner

Tracking Diagram

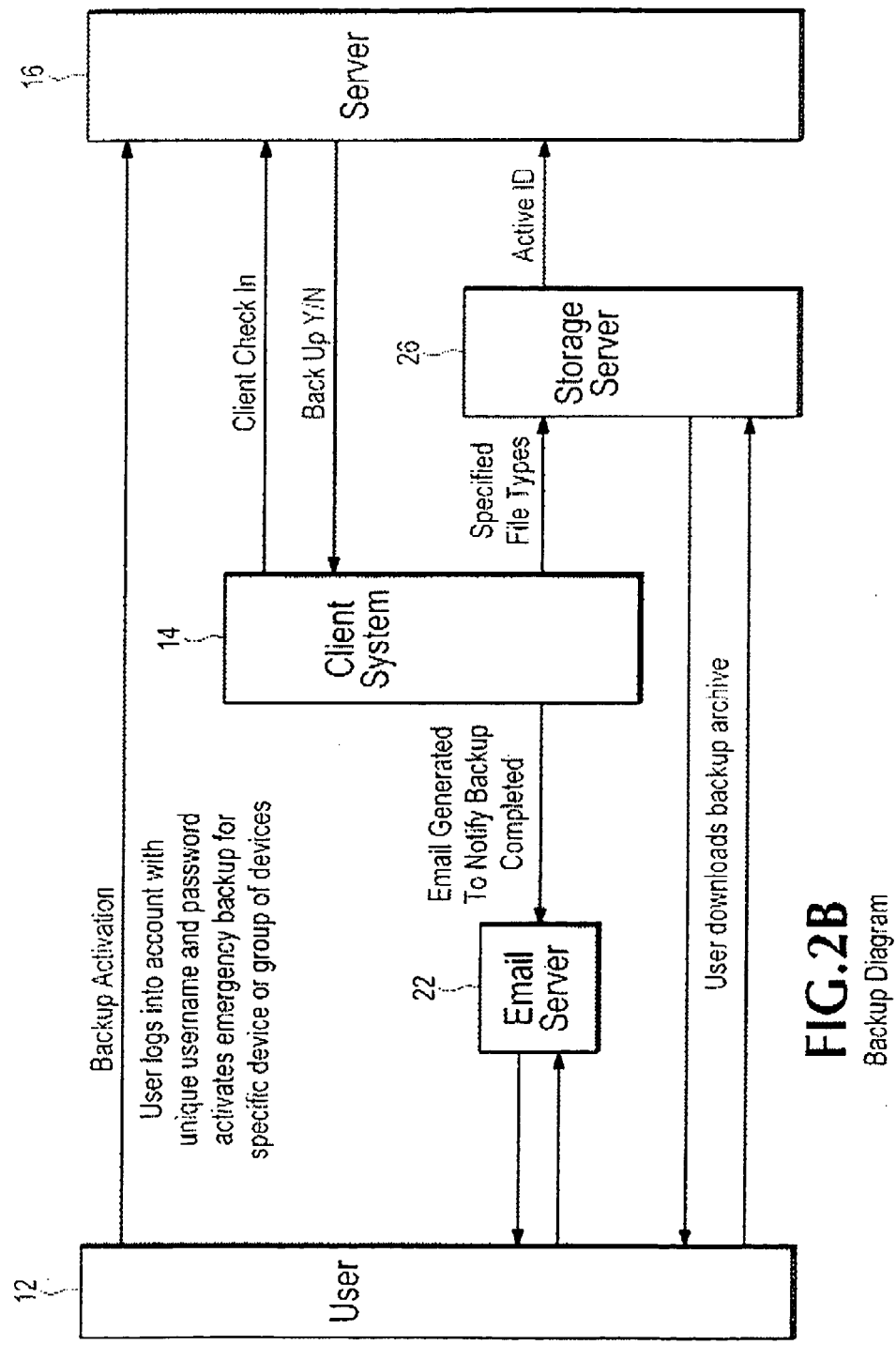

Remote Data Delete Diagram

MOBILE DEVICE OR COMPUTER THEFT RECOVERY SYSTEM AND METHOD

RELATED APPLICATIONS

This application claims the benefit of priority to and is a continuation-in-part of U.S. non-Provisional patent application Ser. No. 11/823,575, filed on 28 Jun. 2007 now abandoned and entitled APPARATUS AND SYSTEM FOR LOST/STOLEN DATA STORAGE DEVICE RECOVERY, which in turn claims the benefit of priority to U.S. Provisional Patent Application Ser. No. 60/892,780 filed on Mar. 2, 2007 and entitled USB DEVICE TRACKING SYSTEM. This application also claims the benefit of priority to and is a continuation-in-part of U.S. Provisional patent application No. 61/197,284 filed on 23 Oct. 2008 and entitled COMPUTER THEFT RECOVERY SYSTEM AND METHOD, the contents of which are hereby incorporated herein in their entirety by this reference.

FIELD OF THE INVENTION

The invention relates generally to the field of locating and managing data residing on lost computers such as desktops, towers, laptops, notebooks, etc. More particularly, the invention relates to tracking, locating, and notifying owner's of the whereabouts of his or her computer, backing up and then erasing ("wiping") data thereon, and involving the owner's on-line social network in such efforts.

BACKGROUND OF THE INVENTION

Computers are ubiquitous, and represent a huge collective capital expenditure. Computers can be lost or stolen from their rightful owners. Loss by theft, especially of portable computers such as laptops and notebooks, is a growing problem. Tracking, locating, and recovery systems and methods have lagged the ubiquity of computers and the probability of loss or theft thereof.

BRIEF DESCRIPTION OF THE DRAWINGS

FIG. 1 will be understood to span two drawing sheets labeled FIG. 1A and FIG. 1B.

FIGS. 2A, 2B, and 2C are a system block/flow diagram of the computer location tracking, data back-up, and data wipe system and method in accordance with another embodiment of the invention.

DETAILED DESCRIPTION OF THE PREFERRED EMBODIMENTS

GADGETTRAK® is a registered trademark of WestinTech, Inc., assignee of patent rights in the present invention. World-wide trademark rights are reserved.

"Mobile Device" as used herein is intentionally broad as including computer workstations, desktop computers, so-called 'laptop' or other portable computers, and notebook or web-based computers that are subject to theft or loss. Such Mobile Devices even within governmental, institutional, or residential facilities are subject to theft by burglary, and thus are within the broad definition herein, and their owners are potentially beneficiaries of the present computer theft recovery invention described, illustrated, and claimed herein.

Figure 1A:
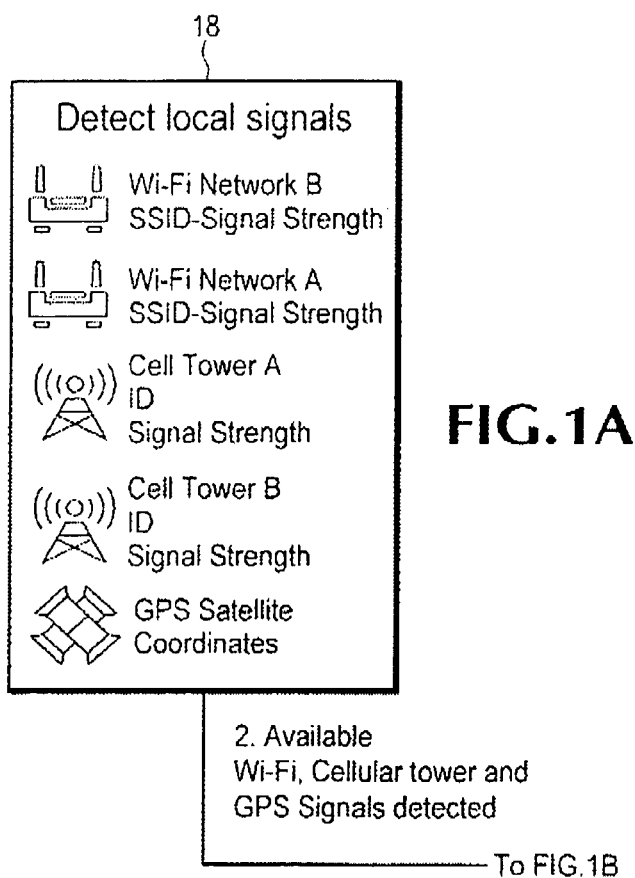
FIG. 1 is a system bock/flow diagram or the computer tracking and locating system and method in accordance with one embodiment of the invention.
Figure 1B:
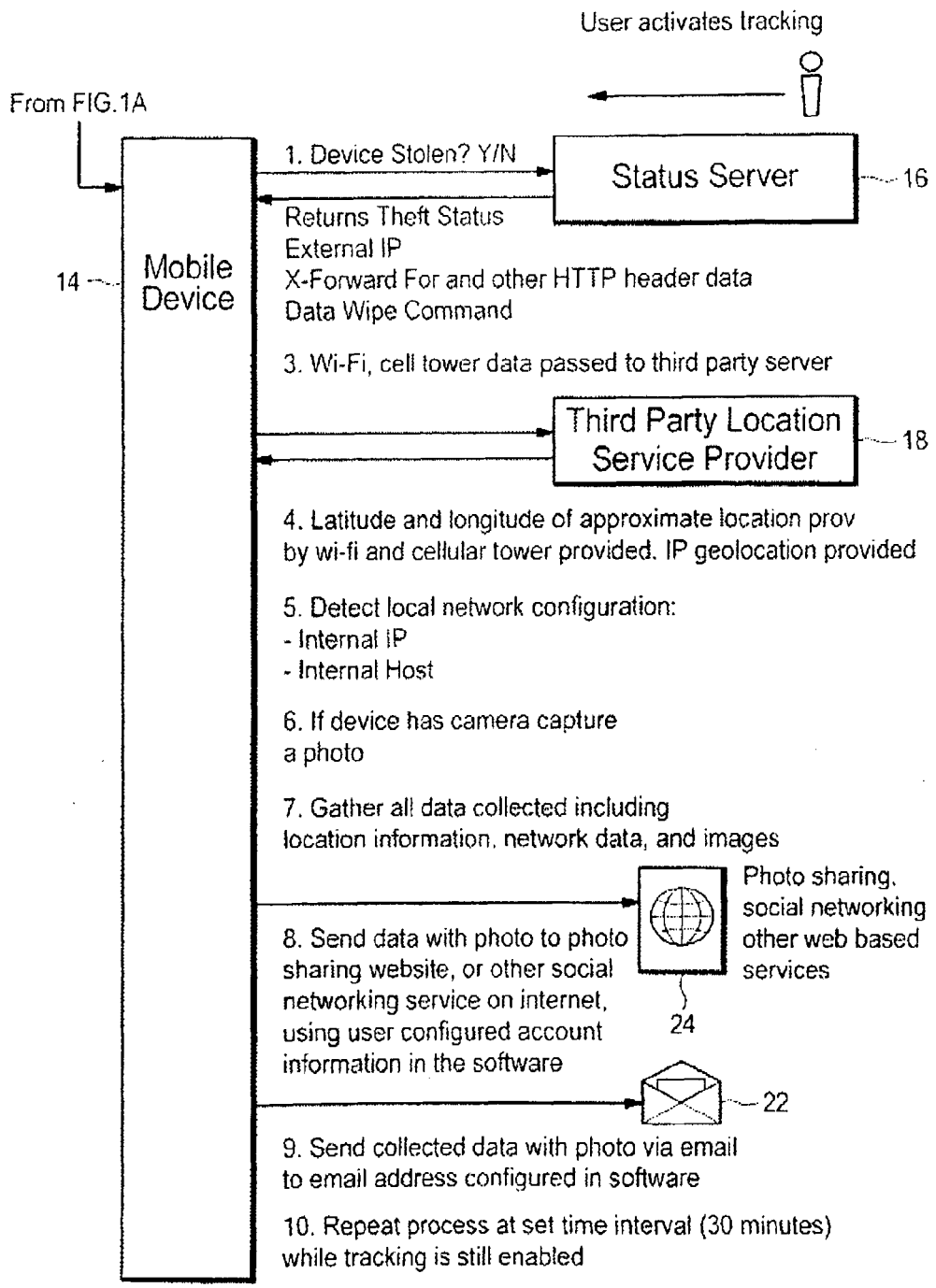

FIG. 1 (including drawing sheets labeled FIG. 1A and FIG. 1B) is believed to be largely self-explanatory. Those of skill in the art will appreciate that Mobile Device includes any computer that is Internet-connectable and/or global positioning system-based (GPS-based). It will be understood that computers that have both Internet-connectivity and GPS can be tracked and located by the invented system in a redundant way that maximizes the probability and specificity of locating it. It may be seen that local signals including one or more Wi-Fi networks, one or more cell towers and a GPS satellite are detected by the Mobile Device, e.g. a lost or stolen computer. It is determined first via a Status Server in communication with the Mobile Device whether the device is stolen. The Status Server returns the Lost/Stolen (Theft) Status, an External Internet Protocol (IP) address, X-Forward-For and other HyperText Transport Protocol (HTTP) header data (if available), and a Data Wipe Command to the Mobile Device. Private, confidential or proprietary, or otherwise sensitive data are erased from the memory of the Lost/Stolen Mobile Device. The Mobile Device sends Wi-Fi and cell tower data to a Third Party Location Service Provider such as SKYHOOK™, which returns to the Mobile Device latitude and longitude data representing the approximate location based thereon. IP geo-location data also returned.

FIG. 1 illustrates at a system block diagram level how the invention works. Local signals are detected by one or more of a pair of Wi-Fi networks A and B, from one or more of a pair of cell towers A and B, and/or from a GPS satellite and sent to a Mobile Device 14 that may be lost or stolen. Mobile Device 14 communicates with a proprietary status server, e.g. the GADGETTRAK® server, regarding theft status, external IP address, X-Forward For and other HTTP header data, and optionally a Data Wipe command. If not GPS, then the detected local signals are sent by Mobile Device 14 to a third-party Location Service Provider 18, and longitude and latitude data are returned to Mobile Device 14. Thus, Mobile Device 14 is involved its own location determination. Mobile Device 14 then detects its local network configuration including internal IP address and internal Host address, it optionally captures a photograph from an attached or embedded web camera (web cam), gathers the collected data together, and optionally sends it to a photo-sharing or social networking service 24 such as FLICKR™ or FACEBOOK™ and/or an e-mail server 22. The process is repeated at a determined interval of time, e.g. thirty minutes, to provide a user with real-time periodic or substantially continuous tracking of the location of the user's Mobile Device 14.

Thus, Mobile Device 14 detects its own local network configuration including its internal IP address and its internal Host data. If the Mobile Device is equipped with a camera, a photograph is captured. All relevant data including location information, network data, and the captured digital image are gathered by the Mobile Device and sent to a photograph-sharing website such as FLICKR™ and/or to a social networking website such as FACEBOOK™ over the Internet using user configured account information stored in the Mobile Device's memory. The collected data including the captured digital image (if available) also are sent via an e-mail to a designated e-mail address owned by the owner of the Mobile Device. Such an e-mail address can be deduced by the software residing in the Mobile Device by browsing the computer's Sent Items or other appropriate e-mail out log. The process can be repeated at set time intervals, e.g. thirty minutes, while tracking is enabled.

Thus, the rightful owner ("User") 12 of Lost/Stolen Mobile Device 14 is alerted to the current (and potentially changing) location of the Mobile Device, along with indicia of the identity of the thief, e.g. a photograph. Concurrently, persons who are acquainted with the rightful owner of the Lost/Stolen Mobile Device may identify the thief or unauthorized user of the computer, and may assist the rightful owner in the recovery thereof. At the election of the rightful owner whose Lost/Stolen Mobile Device has been located, proper law enforcement agencies can also be automatically notified. Such of course is optional and such a law enforcement approach to recovery is or should be at the prerogative of the lost or stolen Mobile Device's owner.

The method of the invention in one embodiment is described below in the form of pseudo-code that explains the steps the software uses to track, locate, and assist recovery of a Lost/Stolen Mobile Device.

1. Once network daemon is enabled and internet connection is detected software is activated.

2. Transmission Control Protocol/Internet Protocol (TCP/IP) connection made to GADGETTRAK® server.

3. Unique device identification (ID) (Media Access Control (MAC) address) is passed to the server.

4. Server checks database to see if the device tracking has been enabled and returns a yes or no answer ("Y" or "N").

5. If server responds to device with a "N" (tracking is not enabled) the program exits.

6. If tracking has been enabled the server responds with a "Y" as well as the device's IP which the server sees.

7. Server checks HTTP header for X-Forwarded-For value to see if a proxy is in use and if the originating IP value is available. If it is, then this is passed back to the device as well.

8. External IP address and X-Forwarded value are parsed and stored in a variable.

9. Network information is gathered from the system, including internal IP address, internal host name, MAC address, and all wireless networks and their Service Set identifiers (SSIDs) that the system can detect.

10. All network data are stored in a variable.

11. Wi-fi network data are gathered from the system, including MAC Address, SSID, and data indicating the strength of the Wi-Fi signal.

12. Wi-Fi router SSID, MAC address, and Wi-Fi signal strength is passed via web service to SKYHOOK™ (or another wireless based location provider).

13. If the device has access to cellular networks, cell tower IDs and the strength of signals data are gathered and sent via web service to cell tower location service. Latitude and longitude are stored in a variable.

14. If the device has GPS hardware, latitude and longitude are accessed and stored in a variable.

15. If a camera is detected on the system either a built-in camera, or a peripheral stand alone camera, the program accesses objects available to control it.

16. A photograph is taken using the camera and stored on the hard drive or internal memory of the system with a pointer for later use.

17. E-mail object is called, e-mail preferences are read from configuration variables including outgoing mail server, user name, and e-mail addresses for both "To" and "From".

18. Network data, location information from Wi-Fi, cell towers and/or GPS are written into the body of the e-mail message. The photo optionally is added as an attachment. The e-mail is delivered to the e-mail address specified in the system.

19. The e-mail is sent directly to the device owner's e-mail account using Simple Mail Transport Protocol (SMTP) settings saved on the GADGETTRAK® system. The information can be sent to the e-mail server via Secure Socket Layer (SSL) to ensure that the data is encrypted between the system and the e-mail server. When the e-mail setting are configured, they are encrypted on the GADGETTRAK® system, so an unauthorized viewer cannot view them. Only the system software can access the e-mail settings.

20. Optionally, an Internet web service call is made passing the photo taken from the system as well as all of the network and location information to a photo sharing site (it can also be other social network type site, within the spirit and scope of the invention). The software uses the authentication token provided by the device owner and photo sharing site to upload the photos and data to the device owner's account on the photo sharing website.

21. Every thirty minutes (or other suitable time period), the software continues to check with the GADGETTRAK® server to see if tracking has been enabled. If tracking is still enabled, then the software gathers data and photographs, and repeats the process.

Those of skill in the art will appreciate that the software installation and setup of the Mobile Device to be tracked can be done in general accordance with the teachings of U.S. Pat. No. 7,496,201 B2 entitled PORTABLE HOST-PLUGGABLE APPLIANCE TRACKING SYSTEM, which issued Feb. 24, 1009 and which is subject to common ownership herewith by WestinTech LLC aka WestinTech, Inc. dba GADGETTRAK®. The contents of that patent are incorporated hereby in their entirety by this reference.

Alternatively, and in the interest of privacy in government and institutional, e.g. corporate, settings, a digital image of the thief or unauthorized user is stored on a GADGETTRAK® archive server and is made accessible only to qualified government or institutional personnel, e.g. the Information Technology (IT) department officials. In this sensitive setting, often Human Resources (HR) rules govern employee relationships with one another and with the employer, and so in such cases there is in accordance with the invention no automatic e-mail or FLICKR notification. Such is straightforwardly implemented as a software switch within a data field in memory that is stored during setup or installation of the computer theft recovery software. Access by authorized personnel might, for example, be double password-protected, so that both the CEO and the HR Director of the company must authorize access to sensitive, e.g. private, information about the theft or unauthorized user of the computer.

Figure 2A:
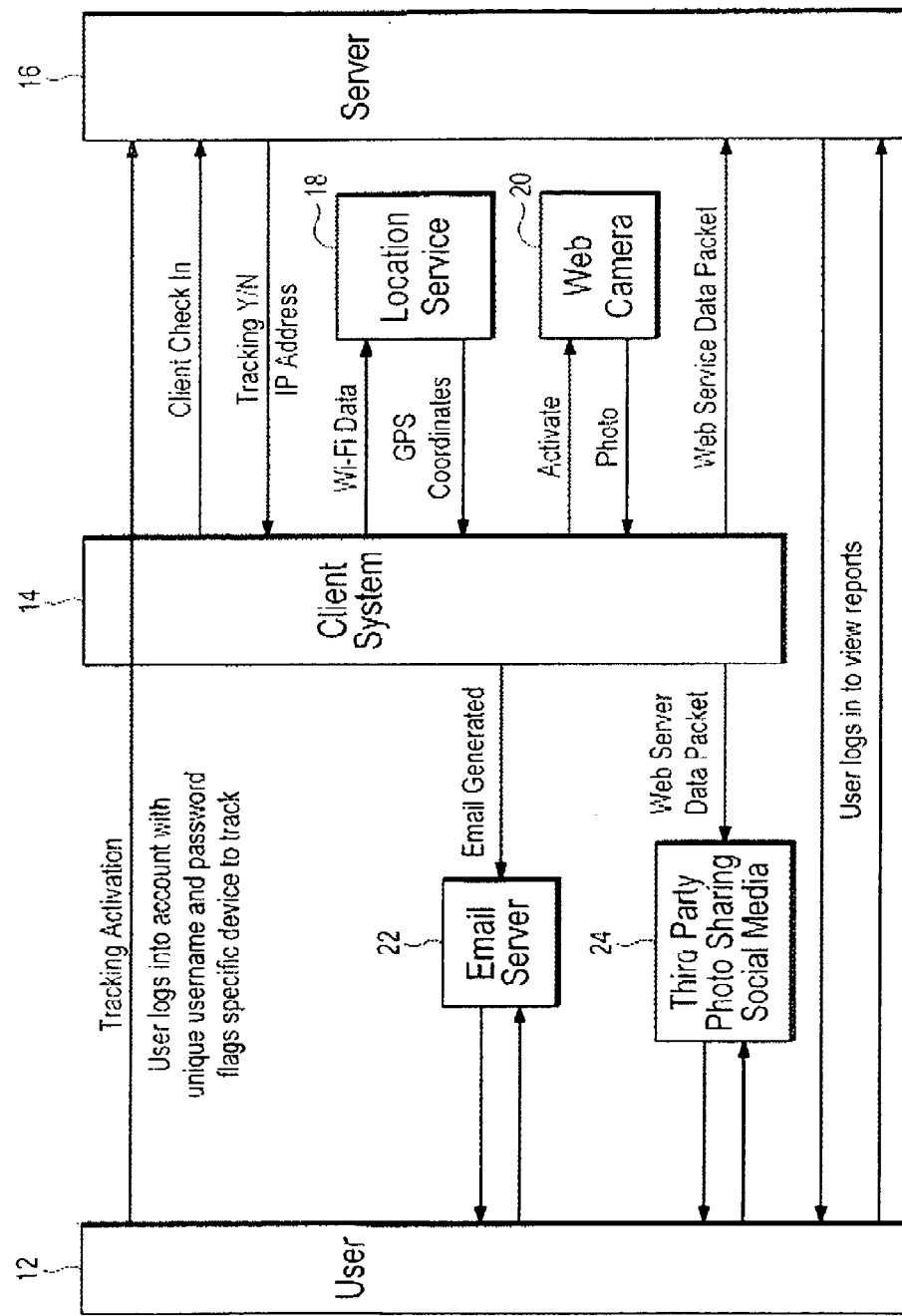
Figure 2C:
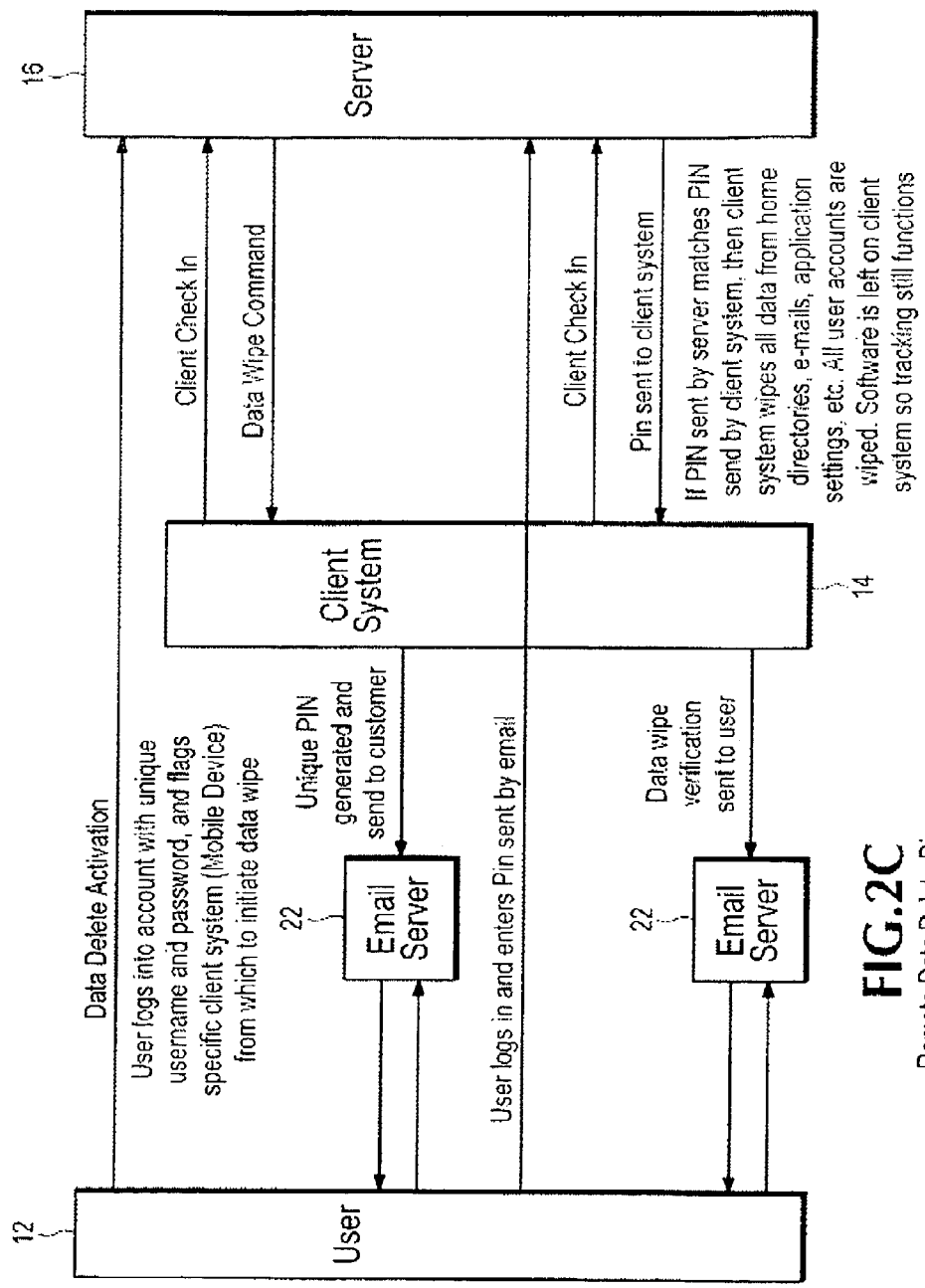

FIGS. 2A, 2B, and 2C illustrate the way in which the invented system and method operate to provide Mobile Device location tracking for recovery purposes, to provide optional data back-up thereof, and to provide data wipe after the data back-up operation is complete. FIGS. 2A, 2B, and 2C are believed to be largely self-explanatory. Those of skill in the art will appreciate that data back-up and wipe are optional, and that the Mobile Device owner is in control of such operations. Thus the invention provides security against unnecessary data back-up (which is time and memory intensive) and against inadvertent data wipe (which is destructive).

FIG. 2A is a Mobile Device tracking diagram that illustrates how a Mobile Device owner or User 12 tracks the location of a Mobile Device or Client System 14 via a proprietary server, e.g. GADGETTRAK® server 16. Those of skill in the art will appreciate that a mechanism 18 for collecting available Wi-Fi, cellular tower or GPS data operatively coupled with client system 14 provides GPS coordinates that enable client system 14 to 'know' where it is located in real and continuous time. Those of skill also will appreciate that a web camera 18 (whether attached to client system 14 or integrated therein, the latter being nearly universally the case for modern laptops most subject to loss or theft) also is operatively coupled with client system 14 and upon activation enables the snapping of a photograph of the person in unauthorized possession of and operating the client system. The photograph can be included in an e-mail delivered by an e-mail server 22 to the rightful or registered owner of client system 14. Alternatively or additionally, the photograph can be posted on a social networking site 24 and can be uploaded also to server 16. Thus a user 12 not in possession of his or her Mobile Device 14 can nevertheless track its location and view its suspected thief.

FIG. 2B is a Data Back-up diagram illustrating how a user's data that is on his or her missing Client System (Mobile Device) 14 can be remotely backed up to server 16 in accordance with the invention. The user logs into his or her GADGETTRAK® account and securely identifies one or more device to be backed up. Server 16 polls client system 14 to ensure that the device is enabled for back up, and, if so, specified file types as described herein are sent to a storage server 26 that may be a cloud and/or third party server. Archive data optionally is sent thereby to the GADGETTRAK® server, as illustrated, unless privacy is a concern, as in a governmental or institutional employment setting where privacy is an issue. E-mail server 22 can be used to notify registered owner or user 12 that back-up has been completed. User 12 is then free to download to a computer in his or her possession the client system data that was recovered or backed up. Thus, photographs, e-mail settings, personal preferences, and other sensitive data are recovered from the lost or stolen Mobile Device 14.

FIG. 2C is a Remote Data Delete diagram illustrating how a user's backed-up data residing in the memory of a lost or stolen Mobile Device 14 is wiped or deleted. User 12 securely logs into his or her account on GADGETTRAK® server 16 and identifies the Mobile Device from which data is to be wiped. When the Mobile Device 14 checks in with server 16 (as described in the above referenced patent) a unique PIN is generated and sent to user 12 via an e-mail server 22. User 12 securely logs in to server 16 and enters the unique PIN received via e-mail. If the PINs match, then a Data Wipe command is sent by server 16 to Mobile Device 14, and data wipe verification is sent to user 12 via e-mail server 12. Those of skill in the art will appreciate that the software residing on Mobile Device 14 that enables it to track and report its location is not deleted so that tracking still can be performed in accordance with the invention.

The Mobile Device owner is provided with a standard prioritized list of file types from which to choose for data back-up purposes. These can include, for example, 1) Office or i-Word or i-Life files, 2) photographs, 3) user chosen files by type, and/or specific files by filename specified by the owner. Those of skill will appreciate that such back-up lists and priorities can be implemented in the form of a back-up hash table by the operating system based upon file extensions, e.g. .ext, .xls, .exc., .jpg, etc. The desired data back-up in accordance with one embodiment of the invention is to a proprietary network server or one or more third party archive network servers referred to as the cloud that are capable of providing high bandwidth and capacity. The owner may set a time window and may receive elapsed-time warnings during such a data back-up operation so that feedback is provided and prioritized data is secured against loss.

After the data back-up operation is complete, the Mobile Device owner has the option of performing a data wipe (erase) operation on the Mobile Device memory. This ensures that sensitive or private data is not viewed or accessed at a later time by an unauthorized user, e.g. the person who stole or fenced the Mobile Device or someone further down in the chain of custody. Such data wipe can be implemented in any suitable way. To prevent potentially disastrous and unrecoverable, unintended data wipe, security features are included in accordance with the invention. FIG. 3C illustrates the way in which a personal identification number (PIN) is e-mailed to the Mobile Device owner and a required PIN returned before data wipe commences. Those of skill also will appreciate from FIG. 3C that there are several levels of protection against unintended data wipe.

Thus, the rightful or registered owner or user 12 of Mobile Device 14 is in control of whether, when, and how his or her mobile device is tracked, its data is recovered, and its data are then deleted or wiped. Moreover, the rightful or registered owner of the Mobile Device is in control of whether, where, and when reports of such location information are disseminated, whether to law enforcement, to social networks, etc. Finally, Mobile Device 14 itself is in control of gathering geo-location data to determine its whereabouts, rather than having this function performed by a central server or service.

In governmental and/or institutional settings, different security and privacy concerns are addressed by the invention. In these and other more sensitive and/or regulated settings, privacy concerns are contemplated by the invention. For example, no photographic images that might be captured when a theft or unauthorized use is detected by the GADGETTRAK® system are sent to a public website. Instead they are maintained in a secure, firewall-protected proprietary server managed by the employer. Thus privacy is secured and human resources (HR) can deal directly with suspect employees in accordance with state and federal statutes and company or agency policies.

To avoid the possibility of a "hi-jacked" or "hacked" server that might be caused to broadcast a spurious data wipe command in Enterprise government, business, or institutional settings, the use of a structured web-based services provision such as Secure Objects Access Protocol (SOAP) and/or an Extensible Markup Language (XML) can be used. Accordingly, to ensure the security of data on the mobile devices from having data wiped due to a compromised server, whereby a malicious user gains access to the database and flags all devices as stolen, security pre-cautions are necessary. The present invention provides a solution to this compromised server scenario as follows.

When the Mobile Device is flagged to remotely wipe data from the device, an initial signal is sent to the device. When the Mobile Device receives this signal it triggers it to generate a unique PIN that is emailed directly to the Mobile Device owner, it is then also stored in the system memory for a set time period before it expires. The user must then click a link to confirm they want to delete the data from his or her Mobile Device and enter their login credentials and then the PIN that was been generated by the system, this is then stored in the database. The next time the device makes a connection to the server this PIN will be passed to the Mobile Device. The software on the Mobile Device then checks to see if the PIN sent by the server matches the PIN it generated. If the PIN matches the software will initiate the data wipe of all documents in the home directories, as well as all software settings and email. Once the data wipe has been completed an email is sent to the device owner. If the PIN number sent by the server does not match the PIN generated by the device, or it goes past a certain amount of time, then the software will abort the data wipe process. The data is delivered to the device using Secure Objects Access Protocol (SOAP) in a structured language (e.g. Extensible Markup Language (XML).

Those of skill in the art will appreciate that alternative models for and approaches to ensuring privacy and security against unauthorized access or impairment of the tracking, data recovery, and data wipe mechanisms are contemplated as being within the spirit and scope of the invention.

Thus, a lost or stolen mobile device such as a portable computer of virtually any form and function can be located with near certainty. Those of skill in the art will appreciate that the location specificity will depend generally upon the population density that drives the placement of Wi-Fi networks and cell towers, for example, such that a lost or stolen mobile device can be found with sufficient specificity as to its location regardless of whether it is located in a relatively rural or relatively urban environment.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. A computer theft recovery system, comprising:
   a mobile device including a memory and a processor that:
   receives a reported theft status and an external internet protocol (IP) address, wherein the reported theft status indicates that the mobile device is or was reported lost or stolen;
   collects available Wi-Fi, cellular tower or global positioning system (GPS) location data representative of a current location of the mobile device and for forwarding the same to a geo-location service provider;
   receives geo-location data from the geo-location service provider;
   detects network configuration data of the mobile device including an internal IP address and an internal host address;
   forwards the network configuration data and the geolocation data directly to a specified personal e-mail address belonging to a registered owner of the mobile device;
   receives a data wipe command; and
   communicates with a storage server to back up encrypted data from the mobile device prior to a data wipe of the mobile device.

2. The theft recovery system of claim 1, wherein the mobile device forwards the network configuration data to a dedicated server.

3. The theft recovery system of claim 1, wherein the mobile device captures graphic image data of a user of the mobile device and forwards the location and the network configuration data including the graphic image data to a photo-sharing, social-marketing or other web-based service.

4. The theft recovery system of claim 1, wherein the mobile device repeatedly forwards location and network configuration data including graphic image data at defined time intervals.

5. The theft recovery system of claim 1, wherein the storage server is a cloud server, and the storage server is decoupled from a server that issues the data wipe command.

6. The theft recovery system of claim 1, wherein the mobile device prioritizes data for the backup prior to completing the data wipe.

7. The theft recovery system of claim 1, further comprising:
   a web-based status server that determines that the mobile device has been reported lost or stolen and provides to the mobile device the reported theft status, the external IP address and the mobile device data wipe command, wherein the web-based status server and the storage server are decoupled from one another in such manner that the web-based status server has no access to the back-up data stored in the storage server.

8. The theft recovery system of claim 1, where access to the storage server is password protected.

9. The theft recovery system of claim 7, wherein the web-based status server confirms with the registered owner of the mobile device whether a data wipe operation is authorized by the registered owner of the mobile device before a data wipe operation commences.

10. The theft recovery system of claim 9, wherein the web-based status server confirms an authorized data wipe operation by sending a personal identification number (PIN) to the registered owner of the mobile device via e-mail, and wherein the registered owner of the mobile device confirms the data wipe operation by entering the PIN.

11. The theft recovery system of claim 7, wherein a structured web services framework is used by the web-based status server and the mobile device to provide security against hacking.

12. A mobile device theft recovery and data recovery method comprising:
   receiving a reported theft status and an external internet protocol (IP) address, wherein the reported theft status indicates that a mobile device is or was reported lost or stolen;
   collecting available Wi-Fi, cellular tower or global positioning system (GPS) location data representative of a current location of the mobile device and for forwarding the same to a geo-location service provider;
   receiving geo-location data from the geo-location service provider;
   detecting the mobile device's network configuration data including an internal IP address and an internal host address;
   forwarding the network configuration data and the geolocation data directly to a specified personal e-mail address belonging to a registered owner of the mobile device;
   receiving a data wipe command; and
   backing up encrypted data from the mobile device to a storage server prior to a data wipe of the mobile device.

13. The method of claim 12, wherein the backing up and data wipe of the mobile device is confirmed by the registered owner of the mobile device using a confirmation method including one or more of password and personal identification number (PIN) entry and verification.

14. The method of claim 12, further comprising forwarding the network configuration data to a dedicated server.

15. The method of claim 12, further comprising capturing graphic image data of a user of the mobile device and forwarding the location and the network configuration data including the graphic image data to a photo-sharing, social-marketing or other web-based service.

16. The method of claim 12, further comprising repeatedly forwarding location and network configuration data including graphic image data at defined time intervals.

17. The method of claim 12, wherein the storage server is a cloud server.

18. The method of claim 12, wherein the encrypted data is selected for back up prior to completing the data wipe based on priority.

19. The method of claim 12, wherein an access to the storage server is password protected.

20. A non-transitory computer-readable medium storing instructions that, when executed by a processor, causes the processor to:
   receive a reported theft status and an external internet protocol (IP) address, wherein the reported theft status indicates that a mobile device is or was reported lost or stolen;
   collect available Wi-Fi, cellular tower or global positioning system (GPS) location data representative of a current location of the mobile device and for forwarding the same to a geo-location service provider;
   receive geo-location data from the geo-location service provider;
   detect the mobile device's network configuration data including an internal IP address and an internal host address;
   forward the network configuration data and the geolocation data directly to a specified personal e-mail address belonging to a registered owner of the mobile device;
   receive a data wipe command; and
   back up encrypted data from the mobile device to a storage server prior to a data wipe of the mobile device.

* * * * *